(12) United States Patent
Bostick

(10) Patent No.: US 8,403,106 B2
(45) Date of Patent: Mar. 26, 2013

(54) MAN-PORTABLE NON-LETHAL PRESSURE SHIELD

(75) Inventor: James H. Bostick, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 252 days.

(21) Appl. No.: 12/983,001

(22) Filed: Dec. 31, 2010

(65) Prior Publication Data

US 2011/0235467 A1 Sep. 29, 2011

Related U.S. Application Data

(63) Continuation-in-part of application No. 12/732,057, filed on Mar. 25, 2010.

(51) Int. Cl.
*G10K 15/04* (2006.01)
(52) U.S. Cl. ....................................... 181/142
(58) Field of Classification Search .................. 367/139; 181/142, 191
See application file for complete search history.

(56) References Cited

U.S. PATENT DOCUMENTS

| | | | |
|---|---|---|---|
| 5,864,517 A | 1/1999 | Hinkey | |
| 5,885,129 A | 3/1999 | Norris | |
| 5,973,999 A | 10/1999 | Naff | |
| 6,017,302 A | 1/2000 | Loos | |
| 6,081,481 A | 6/2000 | Sabatier et al. | |
| 6,359,835 B1 | 3/2002 | Gayl | |
| 6,456,567 B1 | 9/2002 | Blevins et al. | |
| 7,244,464 B2 | 7/2007 | Robens et al. | |
| 7,450,472 B2 | 11/2008 | Guyvarch | |
| 7,515,719 B2 * | 4/2009 | Hooley et al. | 381/18 |
| 7,522,473 B2 | 4/2009 | Zlotnik et al. | |
| 7,724,609 B2 | 5/2010 | Robens et al. | |
| 2005/0138933 A1 | 6/2005 | Tegner | |
| 2005/0232084 A1 | 10/2005 | DiNapoli | |
| 2006/0256559 A1 | 11/2006 | Bitar | |
| 2007/0180811 A1 | 8/2007 | Rasheed | |
| 2008/0006019 A1 | 1/2008 | Tangirala | |

OTHER PUBLICATIONS

Jurgen Altmann "Acoustics Weapons—A Prospective Assessment" Science & Global Security, vol. 9 pp. 165-234 2001.

* cited by examiner

*Primary Examiner* — Jeremy Luks
(74) *Attorney, Agent, or Firm* — Eric A. Gifford

(57) ABSTRACT

A man-portable non-lethal pressure shield provides both a physical as well as pressure shield. The pressure shield addresses the concerns of military, police and human rights organizations and international law as regards effectiveness, efficiency and safety and efficiency. A folded acoustic horn is incorporated into the physical shell of the shield. The horn couples acoustic pulses from a sonic pulse generator to an acoustic aperture to output a pulsed pressure beam that approximates a plane wave to produce a pressure barrier. The operator may specify a desired effect on its human target that is maintained as range-to-target changes or a desired effect at a specified perimeter range. The shields may be networked to facilitate coordinated action among multiple pressure shields as a force multiplier or to provide a more sophisticated pressure barrier.

31 Claims, 16 Drawing Sheets

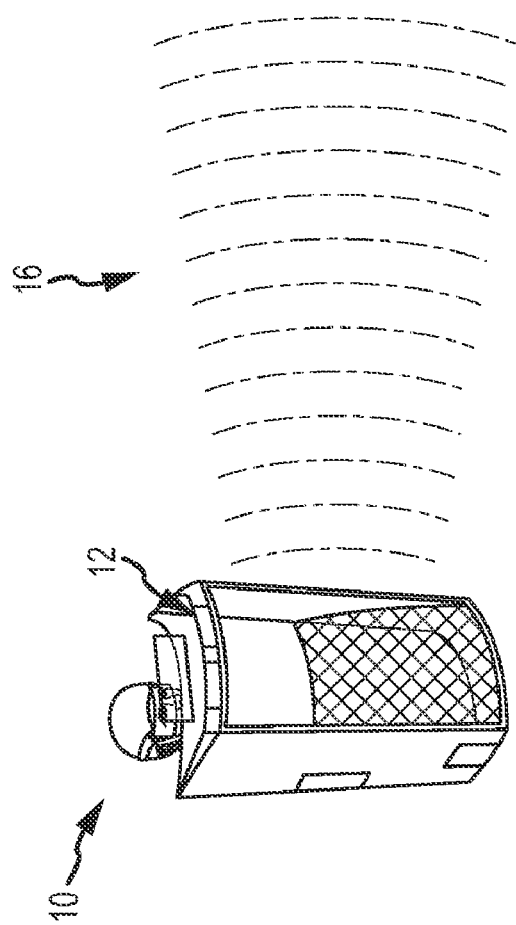
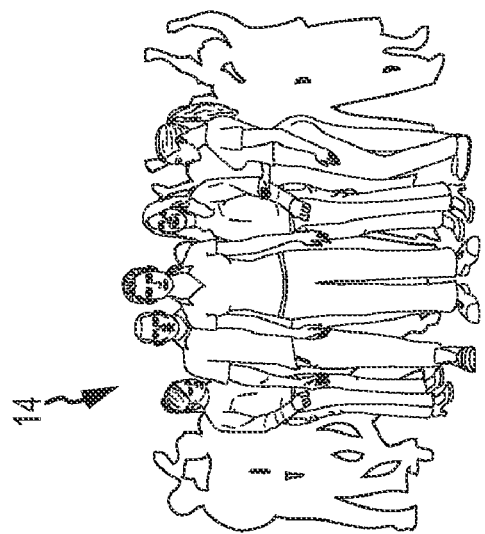
FIG. 1

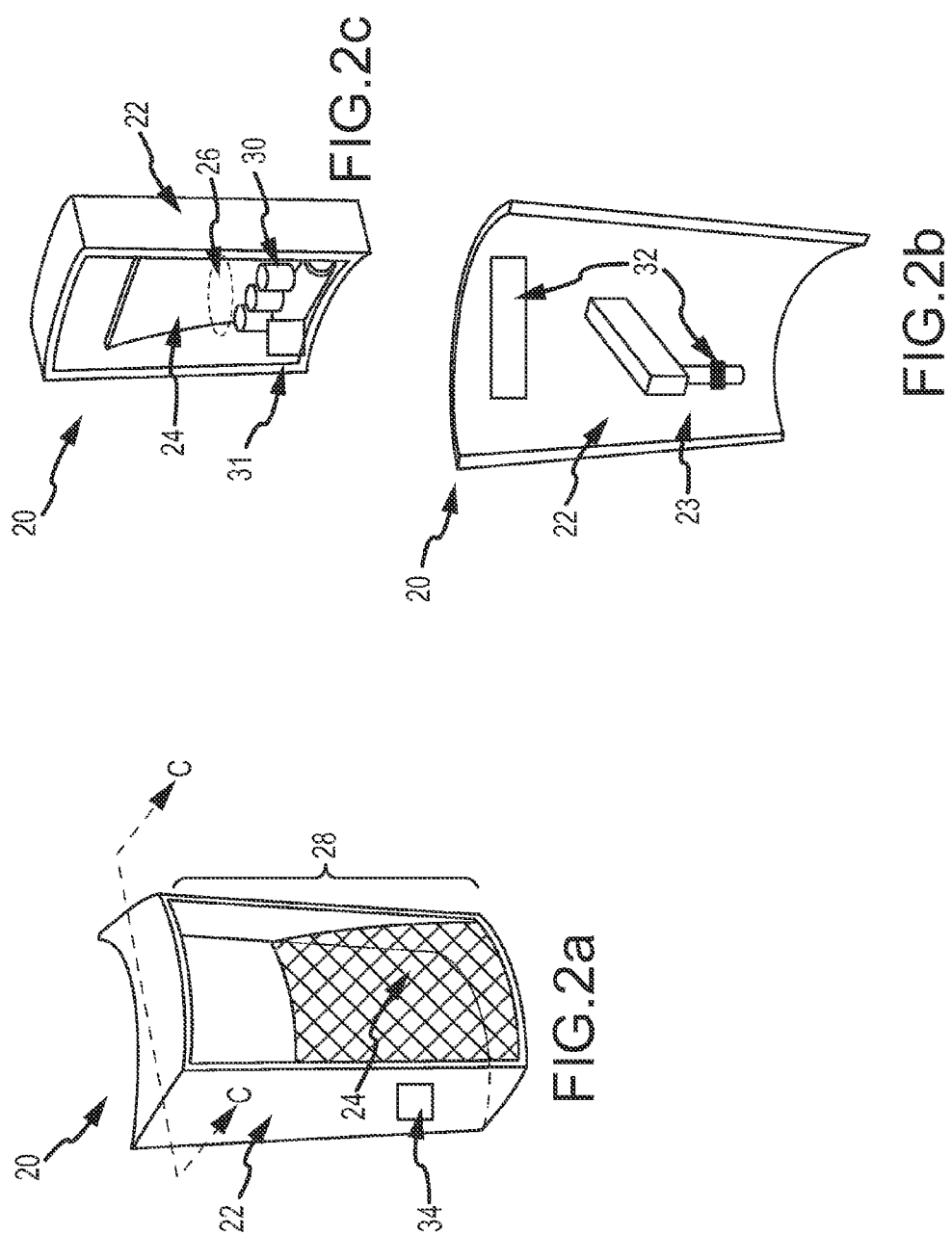

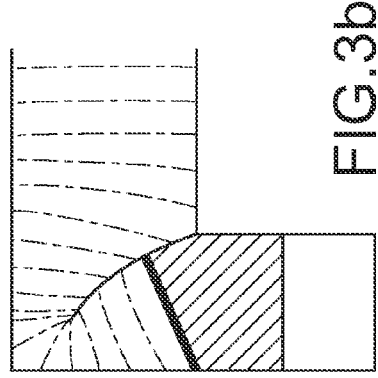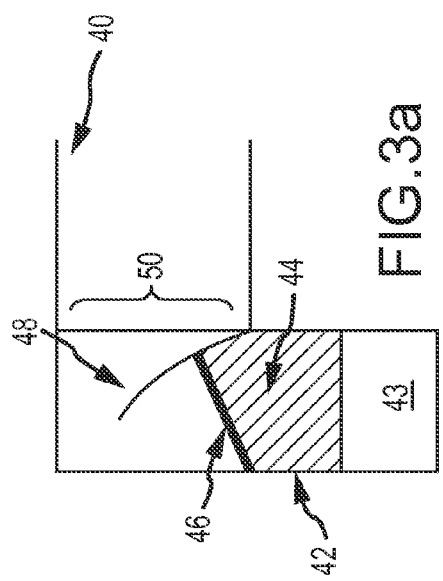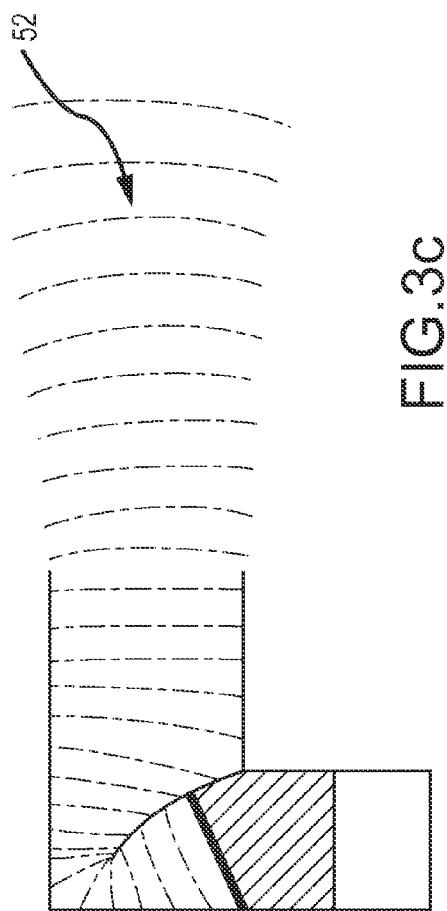

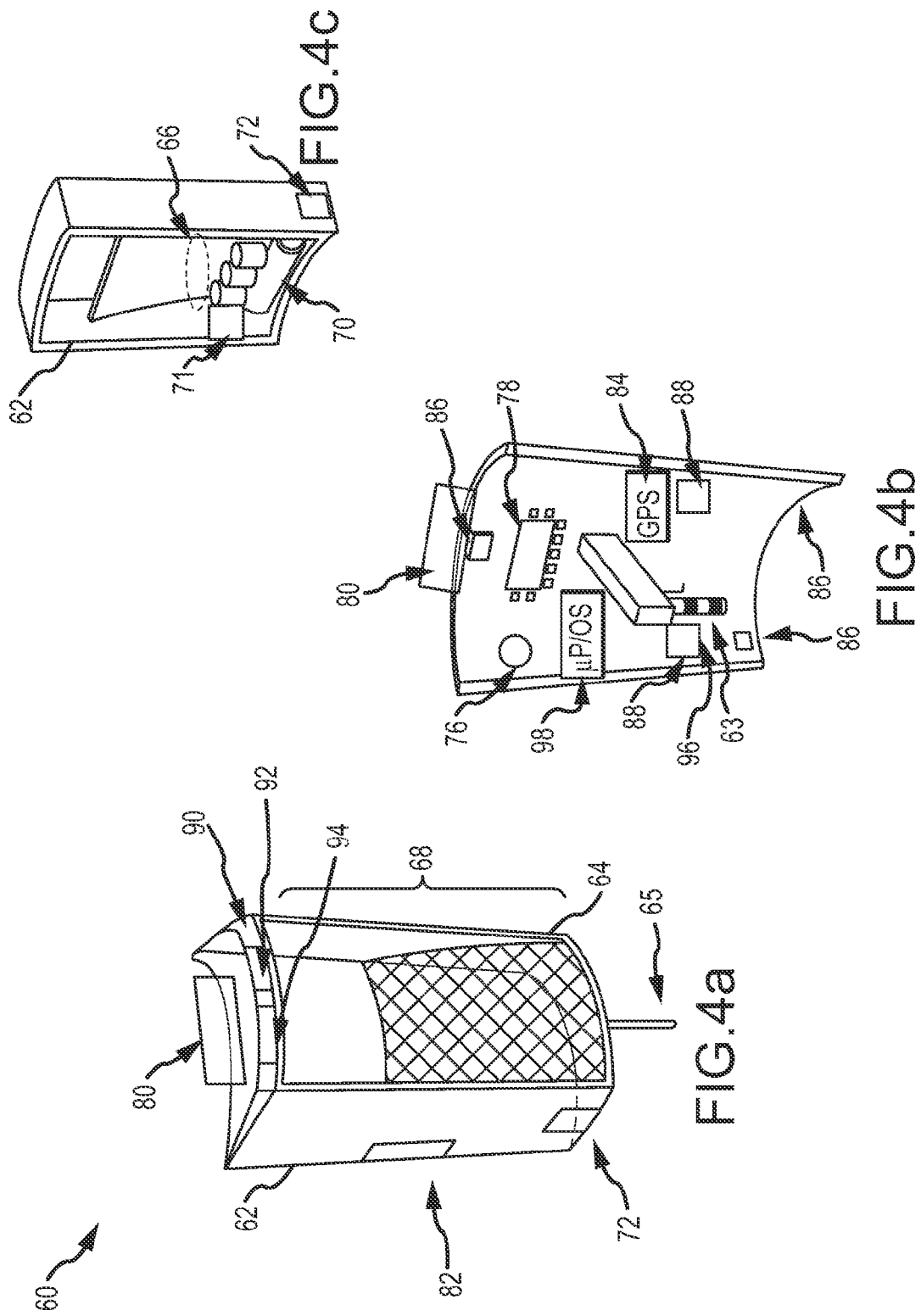

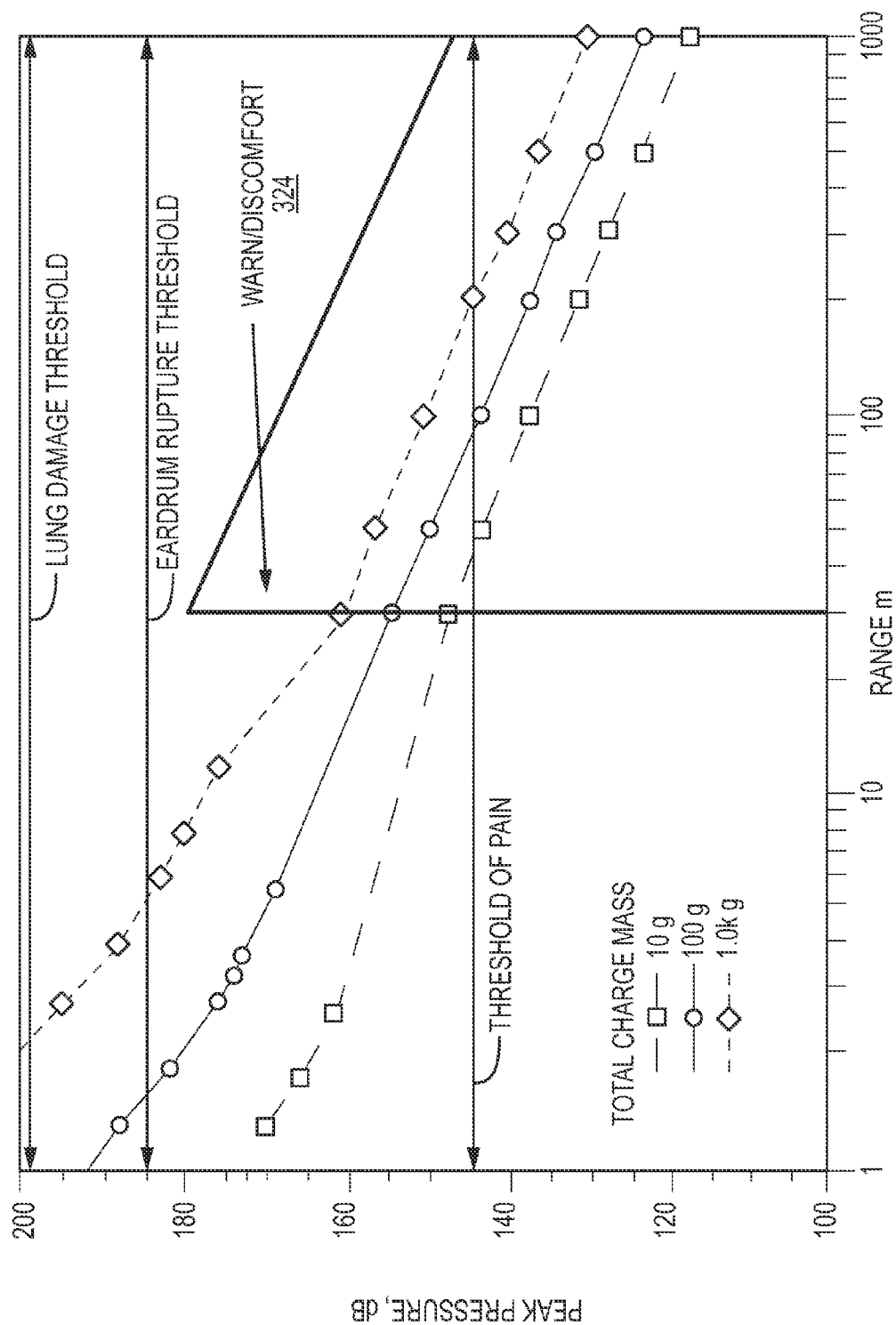

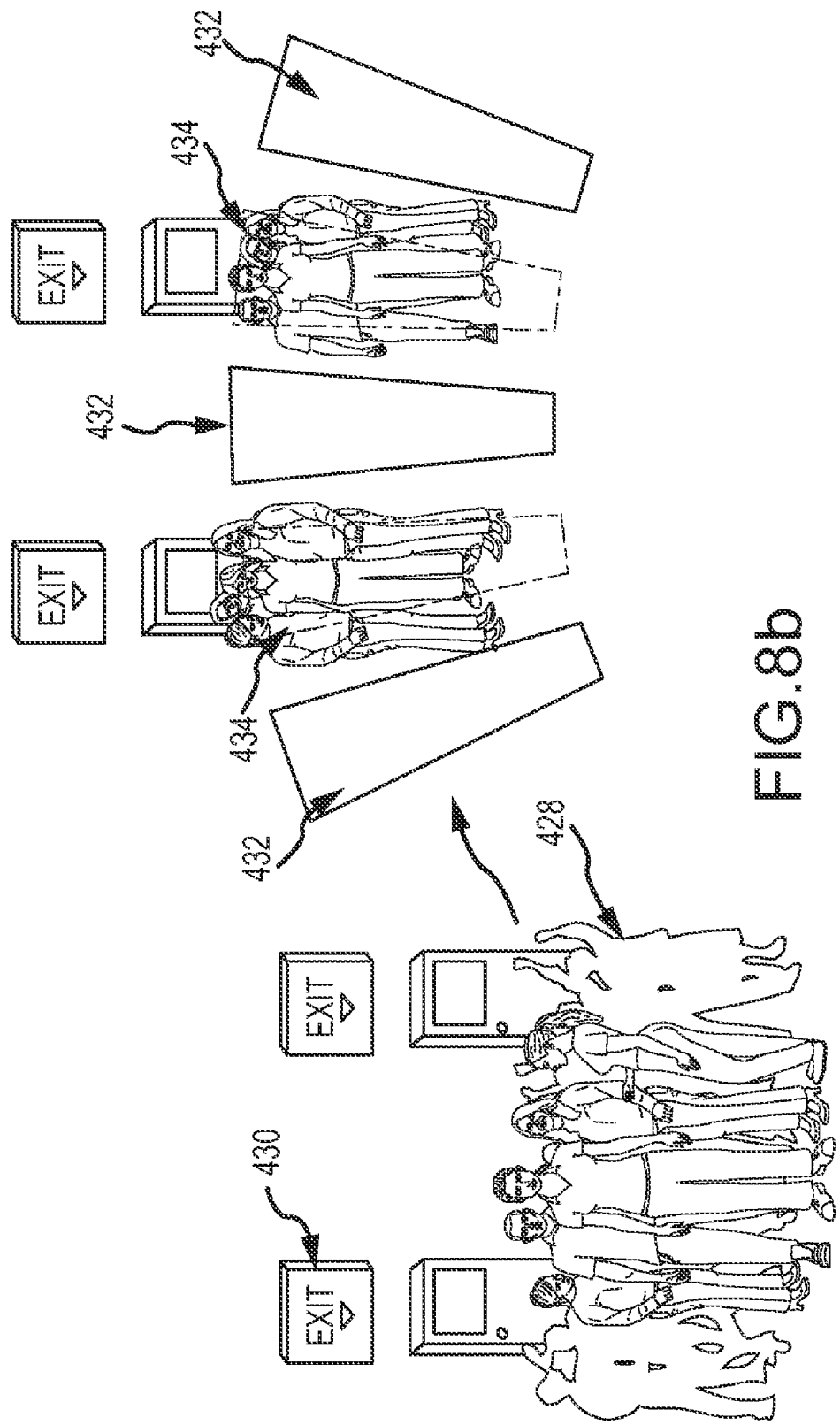

US 8,403,106 B2

MAN-PORTABLE NON-LETHAL PRESSURE SHIELD

CROSS-REFERENCE TO RELATED APPLICATIONS

This application claims benefit of priority under 35 U.S.C. 120 as a continuation-in-part of co-pending U.S. application Ser. No. 12/732,057 entitled "Pressure and frequency modulated non-lethal acoustic weapon" filed on Mar. 25, 2010 the entire contents of which are incorporated by reference.

BACKGROUND OF THE INVENTION

1. Field of the Invention

This invention relates to non-lethal weapons and more particularly to a man-portable non-lethal pressure shield that provides both a physical shield and a pressure barrier useful for crowd control. The pressure shields may be operated independently or coordinated via wireless networking to greater effect.

2. Description of the Related Art

"Since the early 1990s there has been an increasing interest—mainly in the U.S.—in so-called non-lethal weapons (NLW) which are intended to disable equipment or personnel while avoiding or minimizing permanent and severe damage to humans. NLW are thought to provide new, additional options to apply military force under post-Cold War conditions, but they may also be used in a police context. Whereas some foresee a military revolution and "war without death," most others predict or prescribe that NLW would just augment lethal weapons, arguing that in actual war both types would be used in sequence or in parallel. However, there may be situations other than war when having more options of applying force below the threshold of killing could help to prevent or reduce deaths, e.g. in a police context (riots, hostage-taking) or in peace-keeping operations. A range of diverse technologies has been mentioned, among them lasers for blinding, high-power microwave pulses, caustic chemicals, microbes, glus, lubricants, and computer viruses." (Jurgen Altmann, "Acoustic Weapons—A Prospective Assessment, Science & Global Security: Volume 9, pp 165-234, 2001) Altman provides an analysis of acoutic weapons, with an emphasis on low-frequency sound, and particularly the effects on humans. Such weapons have been said to cause disorientation, nausea and pain without lasting effects. However, the possibility of serious organ damage and even death exists.

U.S. Pat. No. 5,973,999 to John T. Naff entitled "Acoustic Cannon" discloses an acoustic cannon having a plurality of acoustic sources with output ends symmetrically arranged in a planar array about a central point. Pressure pulses are generated in each acoustic source at substantially the same time. The pressure pulses exit the output ends as sonic pulses. Interaction of the sonic pulses generates a Mach disk, a non-linear shock wave that travels along an axis perpendicular to the planar array with limited radial diffusion. The Mach disk retains the intensity of the sonic pulses for a time and a distance significantly longer than that achievable from a single sonic source. The acoustic cannon is useful as a non-lethal weapon to disperse crowds or disable a hostile target. As graphically illustrated in FIG. 8, a sonic generator having a mass equivalent to the "total charge mass" equivalency of trinitrotoluene (TNT) is capable of producing a shock pulse effective to cause disorientation and debilitation, without permanent injury, over distances of from less than 10 meters to in excess of 100 meters. As illustrated in FIG. 7, attenuation increases as the frequency increases such that the maximum dominant frequency of the sonic pulses is preferably less than about 7 kHz, and more preferably, less than about 5 kHz. The sound intensity is selected to provide a desired effect to the biological target, dependent on the application. The FIG. 8 distances were computed based on a single sonic source and do not include the $n^{2/3}$ factor that is obtained using multiple sources. As such, FIG. 8 illustrates the minimum over-pressure values at a given range for different values of the source strength (energy). Incorporation of the $n^{2/3}$ factor for multiple sources substantially increases the effective range for a given over-pressure level.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention describes a man-portable non-lethal pressure shield that provides both a physical as well as pressure barrier.

In an embodiment, a man-portable non-lethal pressure shield comprises a physical shell having operator-facing and target-facing sides. A folded acoustic horn is formed within and suitably integrally with the physical shell. The horn has a pressure input port (throat) near the bottom of the shield on the operator-facing side and an acoustic aperture (mouth) on the target-facing side. One or more sonic pulse generators are mounted within the physical shell on the operator-facing side of the horn. Each sonic pulse generator is configured to generate discrete acoustic pulses that are coupled to the pressure input port, travel around the folded acoustic horn and are emitted from the acoustic aperture as a pulsed pressure beam that approximates a plane wave to produce a pressure barrier. The horn converts the large pressure variations produced by the pulse generator over a small displacement area at the input port to lower pressure variations over the larger displacement area of the output aperture. The aperture may be fitted with an extension pipe to control the directivity of the plane wave. A controller executes a firing solution to cause each sonic pulse generator to generate a shot including a burst of multiple pulses at a repetition rate that is coupled to the pressure input port, through the folded acoustic horn and out of the acoustic aperture. The repetition rate is suitably fixed for a given shot but may be varied from shot-to-shot. An operator interface is coupled to the controller and responsive to operator input to trigger a shot.

In another embodiment, the shield is configured to allow its operator to specify a desired effect e.g. warn/stun/incapacitate on its human target. The shield is provided with a sensor that measures range-to-target. The controller adjusts the exit peak pressure of the burst to adjust the peak pressure, hence effect on the human target. The shield can maintain an approximately constant peak pressure, hence effect on the human target as the range-to-target changes.

In another embodiment, the shield may be configured to provide visual targeting and beam width to the operator. The shield may be provided with a display such as a heads up display (HUD). The controller overlays beam pattern information such as beam extent, exit peak pressure, timing and shield position and orientation on the HUD. The operator interface may also provide means for allowing the operator to adjust the beam extent based on the displayed information. The controller adjusts the frequency content of the emitted pulses to control the beam extent.

In another embodiment, the shield may be provided with an assortment of safety features to prevent accidental firing, firing by unauthorized persons, firing if too close to human targets or firing in an unauthorized zone. The shield may be provided with RFID or biometric capabilities that require an authorized operator to be holding the shield to enable firing. The shield may be provided with accelerometers to determine the orientation of the shield to prevent firing down at the ground. The shield may be provided with a proximity sensor to prevent firing if a person is standing too close to the front of the shield. The shield may be provided with GPS and/or RFID capability to determine its location and whether the shield is located in an authorized zone.

In another embodiment, the shield may be configured to provide a networking capability to facilitate coordinated action among multiple pressure shields as a force multiplier or to provide a more sophisticated pressure barrier in the form of a networked beam. The shield may be provided with a wireless transceiver to send beam pattern information and special requests and to receive beam pattern information. Each shield may be provided with a HUD that displays that shield's targeting and beam width and the combined beam pattern of all the networked shields. One shield may be designated as the "master" and the remaining as "slaves" to coordinate the beam patterns. Alternately, the independent beam patterns may be shared (but not explicitly coordinated) among neighboring shields in a "distributed" network. Based on their training and circumstances on the ground and the displayed individual and combined beam patterns, the individual operators could adjust their respective beam to enhance the deterrent effect of the networked beam.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 1 is a diagram of a man-portable non-lethal pressure shield for crowd control;

FIGS. 2a through 2c are different views of an embodiment of a pressure shield;

FIGS. 3a through 3c are section views illustrating a time sequence of the pulsed acoustic beam that approximates a plane wave;

FIGS. 4a through 4c are different views of another embodiment of a pressure shield;

FIGS. 6a and 6b are plots of peak pressure vs. range illustrating different modes for operating the pressure shield;

FIGS. 8a and 8b are diagrams of networked pressure shields providing a perimeter and active crowd control, respectively;

DETAILED DESCRIPTION OF THE INVENTION

Figure 5A:
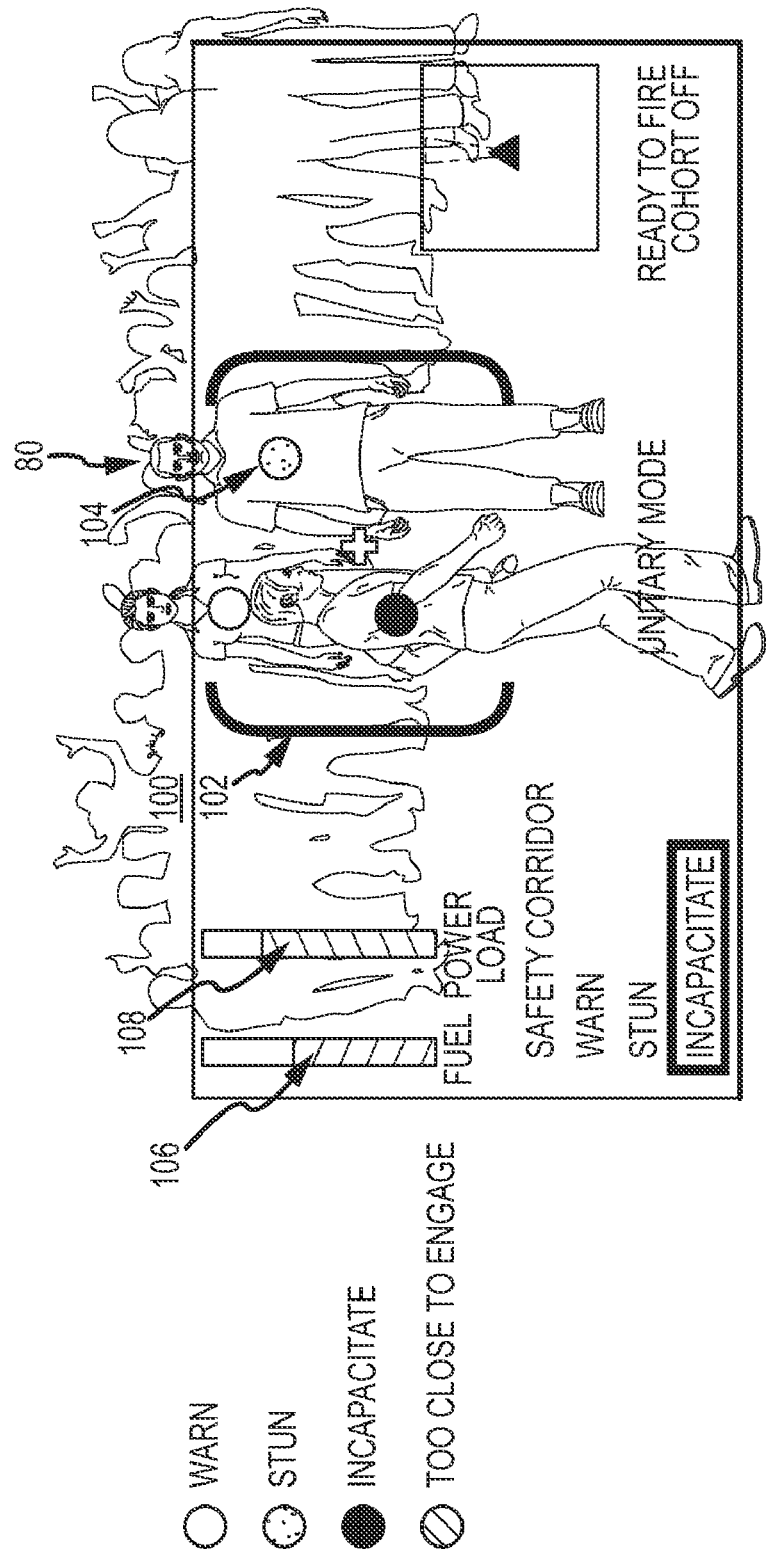
FIG. 5 is a diagram of the shield's heads up display (HUD) illustrating targeting, beam extent and orientation.

The present invention describes a man-portable non-lethal pressure shield well suited to address the concerns of military, police and human rights organizations and international law as regards effectiveness and safety and efficiency. The dual-use shield provides both a physical as well as a pressure barrier. Although the shield will produce loud pulses, its primary effect is to couple a pulsed pressure wave or "barrier" to a human target's upper respiratory tract to warn, deter or temporarily incapacitate the target. This can be achieved at pressure levels that do not damage the ear. The terms "acoustic" and "pressure" are often used interchangeably as related to non-lethal weapons. We use the term "pressure" to emphasize that the shield is generating a pulsed pressure barrier that couples to the respiratory tract and not merely creating loud noise.

As shown in FIG. 1, a human operator 10 uses a man-portable non-lethal pressure shield 12 to provide both a physical as well as a pressure barrier to warn, deter, incapacitate or otherwise control a crowd of people 14. The pressure shield is formed within and suitably integrally with the physical shell. The operator may trigger one or more pressure sources within the physical shell to generate a shot including a burst of multiple pulses at a repetition rate. The burst is emitted as a pulsed pressure beam that approximates a plane wave 16 to apply a peak pressure to the crowd or a targeted portion of the crowd. The shield may be configured to allow its operator to specify a desired effect e.g. warn/stun/incapacitate on its human target. The shield may be configured to provide visual targeting and beam pattern information to the operator via a display such as a heads up display (HUD). The shield may be provided with an assortment of safety features to prevent accidental firing, firing by unauthorized persons, firing in an unauthorized zone or firing if too close to human targets. The shield may be configured to provide a wireless networking capability to facilitate coordinated action among multiple pressure shields as a force multiplier or to provide a more sophisticated pressure barrier.

As shown in FIGS. 2a-2c, in an embodiment a man-portable non-lethal pressure shield 20 comprises a physical shell 22 having operator-facing and target-facing sides. Shell 22 is provided with means such as a pistol grip 23 for holding the shield. A folded acoustic horn 24 is formed within and suitably integrally with the physical shell. The horn has a pressure input port (throat) 26 near the bottom of the shield on the operator-facing side and an acoustic aperture (mouth) 28 on the target-facing side. One or more sonic pulse generators 30 are mounted within the physical shell on the operator-facing side of the horn. A controller 31 controls each sonic pulse generator to generate a shot including a burst of multiple acoustic (pressure) pulses at a repetition rate that is coupled to the pressure input port 26, travel around the folded acoustic horn 24 and are emitted from the acoustic aperture 28 as a pulsed pressure beam that approximates a plane wave. The repetition rate of the pulses within a given burst is typically fixed. The shield may however modulate the repetition rate between bursts. An operator interface 32 (e.g. mechanical controls and/or displays) is coupled to the controller and responsive to operator input to trigger a shot. The operator interface will typically provide additional functionality. The shield may be provided with a wireless network 34 to communicate and possibly cooperate with other pressure shields. The shield includes a portable power source such as a battery to power the on-board systems.

Pressure shield 20 is suitably configured with folded acoustic horn 24 within physical shell 22. The acoustic horn 24 and physical shell 22 may be formed as a single integral piece. Alternately, the horn could be mounted on the target-facing side of a physical shield retrofit to include the pressure systems. The acoustic horn and physical shell may be formed of a transparent material in whole or in part to allow the operator to visualize the scene.

Folded acoustic horn 24 is a tapered sound guide designed to provide an acoustic impedance match between the sonic pulse generators and free air. The horn maximizes the efficiency with which sound waves from a particular generator are transferred to the air. Acoustic horns convert large pressure variations with a small displacement area into low pressure variations with large displacement areas and vice versa. This is achieved through the gradual increase in cross-sectional area of the horn. The small cross-sectional area of the input port or throat restricts the passage of air, which presents higher impedance to the generator. This allows the generator to develop a higher pressure for a given displacement. Therefore the sound waves at the throat are of higher pressure and lower displacement than at the output aperture or mouth. The tapered shape of the horn allows the sound waves to gradually decompress and increase in displacement until they reach the output aperture, where they have a lower pressure with a larger displacement. The particular shape of the shield, specifically the size and shape of the exit aperture, is based at least in part on the acoustic specifications (e.g. directivity, frequency, and portability requirements) of each customer.

Sonic pulse generators 30 may use a variety of technologies. Such technologies include but are not limited to electromagnetic systems that use electric power to energize magnetic structures to create controlled movement to produce acoustic pulses, pressurized gas and valve systems, chemical reaction systems using various fuels and oxidizers, and pulse jet systems. Any technology that can produce acoustic pulses of sufficient amplitude at a programmable repetition rate and which can be configured within a footprint that fits inside the physical shell may be used.

Controller 31 controls each sonic pulse generator to generate a shot including a burst of multiple pulses at a fixed repetition rate. Controller 31 may comprise one or more computer processors and computer program instructions and/or physical control systems that control, for example, the amplitude and duration of individual pulses, the number of pulses in a burst and the repetition rate of the pulses within the burse. The computer processor(s) are configured to generate and execute a firing solution to command the physical control systems and sonic pulse generators to produce a particular shot. The computer processor(s) may have a base or fixed firing solution, which may be altered based on operator input, sensor input or received commands to cooperate with other shields. More generally, the computer processor(s) implement a pressure shield operating system (OS) that manages the various systems. The physical control systems may, for example, modulate the exit peak pressure or center frequency of the burst. The control systems may modulate the peak pressure by modulating the output pressure of the sonic pulse generator directly, controlling the number of pulses in the burst or by variably attenuating a fixed output pressure of the generator. For multi-pulse bursts, the frequency content is well defined but fixed within each particular burst. The control systems may modulate the center frequency by modifying the repetition rate of the pulses, modulating the frequency content of individual pulses or adjusting the input impedance of the input port.

Operator interface 32 allows (at a minimum) an operator to trigger a shot. This simple interface may be a trigger on the pistol grip, a button or switch on the shield or a touch-screen as part of a multifunction display. The interface may provide additional functionality including, but not limited to, allowing the operator to select a firing sequence (e.g. single shot per trigger pull, a number of shots at a specified interval or automated firing at a maximum rate as long as the trigger is pulled), desired effect (e.g. warn/stun/incapacitate) on the target, to control the beam extent, to enter "cohort mode" to work cooperatively with other shields, to visualize the beam overlaid on the targeted scene and to visual targeting cues from the master or neighboring shields. This may be accomplished with a multifunction display and camera system or with a transparent heads up display (HUD).

The optional wireless network 34 allows the shield to communicate and possibly cooperate with other pressure shields. The level of cooperation may be to simply share beam pattern information (e.g. some or all of shield position/orientation, beam extent, exit pressure and timing) of the respective shields. Each shield's active beam and the networked beam may be displayed to each operator. Based on their training and the real-time circumstances unfolding on the ground, the individual operators can adapt their position/orientation and firing solution to provide a more effective deterrent or control. Alternately, one of the shields (e.g. highest ranking operator or designated operator) may be designated as the "master" with the other shields being "slaves". The master would select a desired networked beam and compute beam patterns for each of the shields and transmit the beam patterns to those shields. Either the "master" or the individual "slave" may have the capability to alter the beam pattern to correct for any error, changes in the slave's position/orientation, composition of the network or changes to the target or desired effect on the target.

The shield may be provided with a sensor package to support the controller, interface or network functionality or to support various safety systems. The sensor package may comprise a range sensor such as a laser range finder to provide range-to-target measurements, range being required to set the peak pressure on the target for a selected effect. The package may include an optical sensor or camera to provide video of the target scene. The package may include a GPS receiver and/or RFID triangulation antennas and inertial sensors to provide the position and orientation of the shield, useful for either "cohort mode" or to verify the shield is within an approved zone of use. The package may include a proximity sensor to disable the shield should anyone be too close to the front of the shield. The package may include biometric sensors or RFID sensors to identify and verify an authorized operator. The package may include environmental sensors (temperature, humidity, barometric pressure) as environmental conditions may effect the propagation of the plane wave and coupling to the target.

An embodiment of the acoustic/pressure flow from a pressure shield fitted with an extension pipe 40 is depicted in FIGS. 3a through 3c. A sonic pulse generator 42 supplied with fuel 43 generates high-pressure low-displacement pressure variations (acoustic pulses) 44 that are coupled to a pressure input port 46, travel (fold) around the folded acoustic horn 48 and are emitted from the acoustic aperture 50 in a lower-pressure higher-displacement pressure variation as a pulsed pressure beam 52 that approximates a plane wave and directed towards the target. The shield transmits only the positive side of a waveform in a pulse. Atmospherically supplied rarefaction provides the negative side of the waveform to place a pulse on the target to apply the peak pressure. The length of extension pipe 40 (if used) is determined by the specification on directivity. In this embodiment, acoustic aperture 50 is square rather than rectangular. As the shield is generally rectangular, the square aperture can either be positioned flush with the top or bottom of the shield or somewhere in the middle offset from both the top and bottom of the shield. For any acoustic shield variant that tapers to the ground, the ground acts as an additional part of the horn surface, providing improved impedance matching to the ground. This, in turn, improves the transfer characteristics to the target to some degree, depending on the ground conditions of that firing.

Atmospheric pressure waves exhibit the same direction of oscillation as their direction of travel. The compression of the wave corresponds to pulses between areas of rarefaction. The wavelength between compression/pulses corresponds to the repetition rate of the pulses and center frequency of the burst frequency content. Such a burst provides well-defined frequency content about a center frequency (Fc). A repetition rate of 5 milliseconds produce a center frequency positioned to couple to the resonance mode of the human target (typically approximately 200 Hz). The frequency response of the burst may have a bandwidth no greater than 10% and suitably no greater than 5% of its center frequency Fc. The frequency response is primarily defined by the uniform placement of multiple pulses within a burst and only secondarily defined by the configuration of the pulse generator itself. A well-defined frequency response couples more efficiently to the target and reduces the amount of wasted energy.

An embodiment of a pressure shield 60 as shown in FIGS. 4a-4c includes more of the functionality described above. Shield 60 comprises a physical shell 62 having operator-facing and target-facing sides. Shell 62 is provided with means such as a pistol grip 63 for holding the shield and means such as a ground support pin 65 for resting the shield on the ground. A folded acoustic horn 64 is integrally formed with the physical shell. The horn has a pressure input port (throat) 66 near the bottom of the shield on the operator-facing side and an acoustic aperture (mouth) 68 on the target-facing side. One or more sonic pulse generators 70 are mounted within the physical shell on the operator-facing side of the horn. In this embodiment, the generators comprise a chemical reaction system that mixes a fuel and an oxidizer. A controller 71 controls the timing and stochiometry of mixing the fuel and oxidizer to generate a shot including a burst of multiple pulses at a fixed repetition rate. For convenience, the shell may be provided with a magazine port 72 for easy replacement of the fuel and oxidizer magazines as they are expended. The pulses are coupled to the pressure input port 66, travel around the folded acoustic horn 64 and are emitted from the acoustic aperture 68 in a pulsed pressure beam that approximates a plane wave.

An operator interface including a trigger 74 on the pistol grip allows the operator to trigger a shot, a dial 76 allows the operator to vary the beam extent (e.g. 3 dB beam width), a multifunction display 78 provides the operator with various mission inputs and allows the operator to select various functions such as operation mode (unitary or cohort), effect on target (warn/stun/incapacitate) and so forth, and a heads up display (HUD) 80 that allows the operator to view the beam and other beam pattern information overlaid on the target scene. The shield is provided with a wireless network/proximity contact antenna 82 to communicate and possibly facilitate cooperation with other pressure shields. The shield is provided with a sensor package including a GPS receiver 84, RFID triangulation antennas 86 and accelerometers 88 to determine the shield's position (x,y,z) and orientation (yaw, pitch, roll), a range sensor 90, an optical sensor 92, a proximity sensor 94 and a handgrip detector 96. The shield is provided with a micro-processor (µP) 98 including computer program instructions that implement the shield OS that manages all of the associated controls, displays, triggers, sights, visual systems, pressure modulation systems, safety management systems, attitude and positional inputs, and proximity networking systems.

Figure 5B:
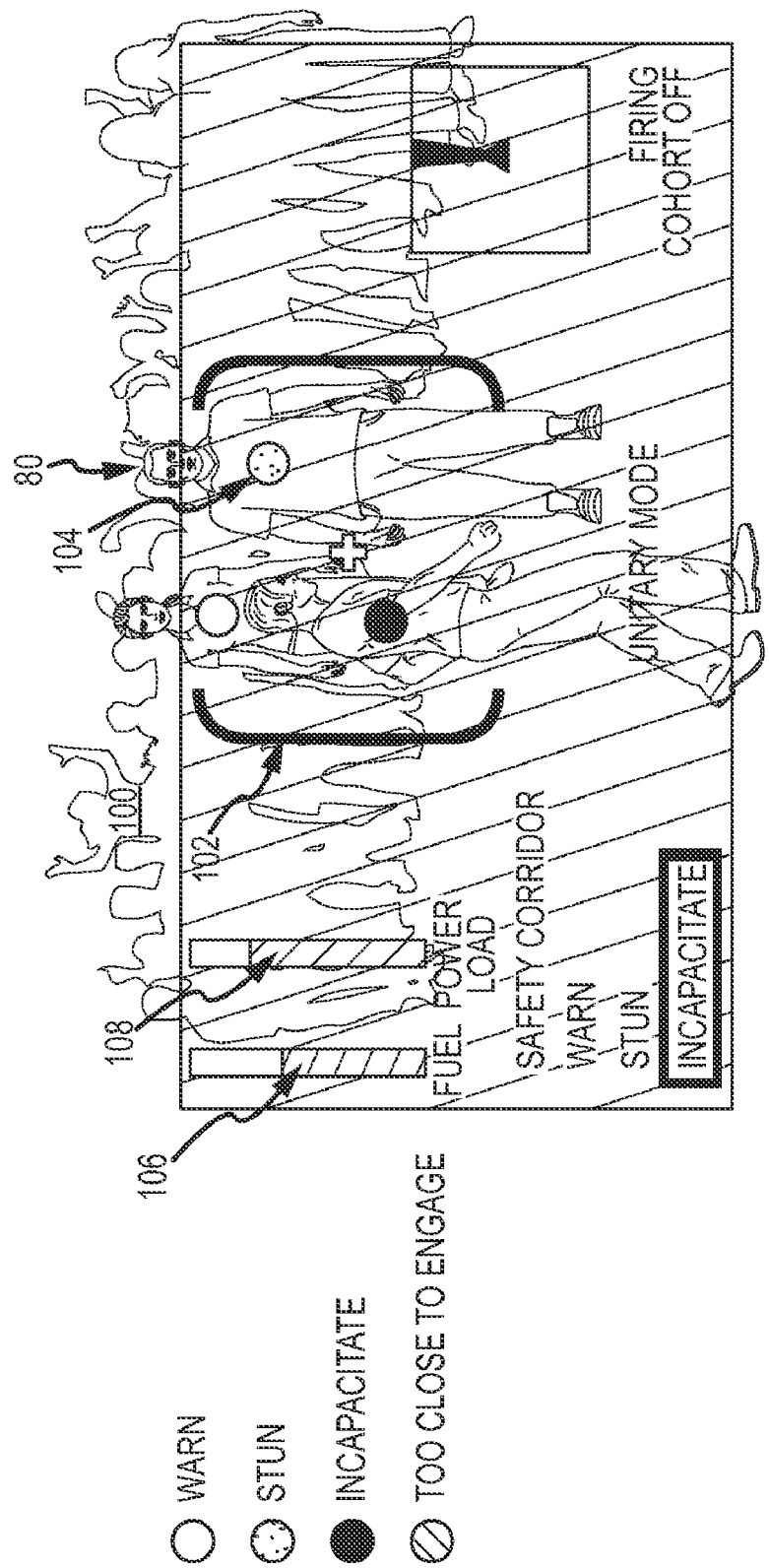

An example of HUD 80 is depicted in FIGS. 5a and 5b. As illustrated, a target scene 100 is visible through the transparent HUD 80. The HUD overlays brackets 102 that define the extent of the plane wave beam generated by the shield for the current firing solution. The extent of the beam (beam width) may be defined as the 3 dB point down from the peak pressure. The operator may use dial 76 to move the bars in and out to control the extent of the beam to either single out individual targets or to expose a larger area. In this configuration, the shield also measures the range to any target within the beam extent, estimates the peak pressure on each target for the current firing solution and displays a colored spot 104 on the target indicative of the effect the beam will have on each target. For example, warn may be green, stun light yellow, incapacitate orange and too close to engage red. If the operator selects a desired effect, the shield will compute a firing solution for the closest target within the extent of the beam. In this depiction, the shield is operating in Unitary mode and the engagement level is INCAPACITATE. The shield is configured to incapacitate the closest target within the beam extent. The HUD also provides a fuel bar 106 that indicates the amount of fuel remaining and a power load bar 108 that indicates the power level as a function of maximum power. The HUD may also display the orientation of the shield. This may be a simple compass or may be a digital readout that provides yaw, pitch and roll. The HUD may also display the position of shield. As shown in FIG. 5b, the HUD may display an icon such as "firing" and turn the display "red" as indicated by the hatching to indicate that the shield is currently firing.

If operating in cohort mode, the HUD may overlay brackets 102 for the shield's beam extent and the combined beam pattern for some or all of the cooperating shields. The HUD may display arrows or other icons to direct the operator to either widen or narrow the beam extent based on the beam patterns or special requests of other shields. The HUD may also display both the shield's actual orientation and the orientation required to execute the prescribed firing solution or directional arrows for the operator to reorient the shield. The HUD may display both the shield's actual position and the position required to execute the prescribed firing solution in cohort mode. The HUD may display a firing countdown until the shield fires its next shot, as for example dictated by a master shield in cohort mode.

Figure 6A:
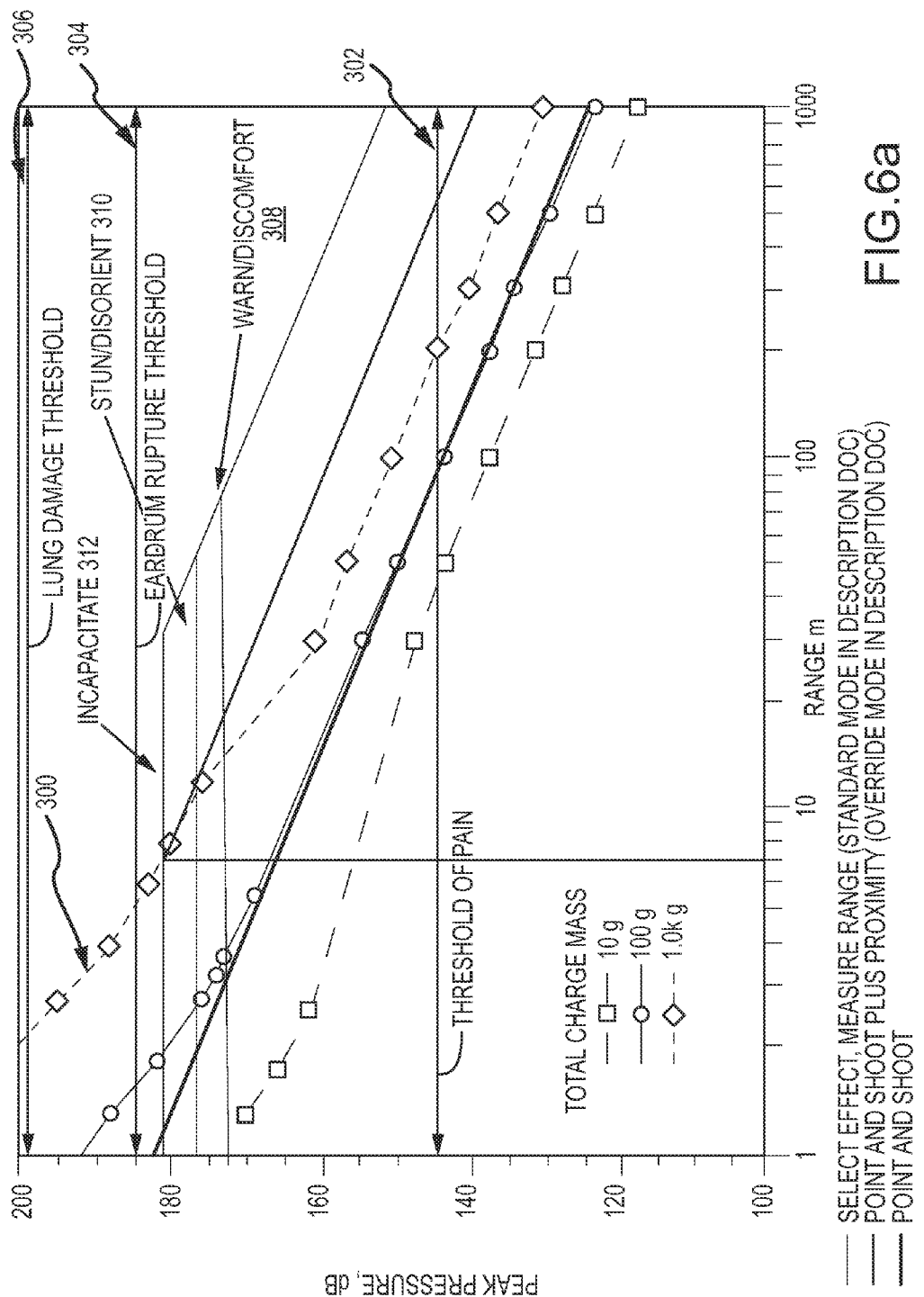

FIGS. 6a and 6b are plots of peak pressures 300 on target versus range for various modes of operation of a pressure shield. Peak pressure in dB is twenty times the log base ten of the ratio of the overpressure to the ambient pressure ($20 \log_{10}(P_{over}/P_{tamb})$). The peak pressure of a plane wave falls off approximately 3 dB for every doubling of distance. The peak pressure on target depends to a first order on the peak pressure generated at the shield and the range-to-target. The peak pressure also depends to a lesser extent on atmospheric or environmental conditions and characteristics of the target that both affect the propagation of the plane wave and coupling of the plane wave into the target. As the use of the pressure shield is generally limiting to human targets and resonance has been observed in humans from 5 Hz up to approximately 500 Hz, coupling losses to the target may be factored into the firing solution. Propagation losses due to atmospheric or environmental conditions may be either assumed to have a nominal value or factored into the firing solution via operator selection of conditions (e.g. over ground or concrete, approximate temperature, etc.) or via environmental sensors or a combination thereof.

Extensive testing on human subjects shows that a pain threshold 302 occurs at approximately 145 dB, an eardrum rupture threshold 304 for overpressure events shorter than 400 ms at approximately 185 dB and a lung damage threshold 306 ranging from 194 dB to 205 dB, depending on duration ranging from 3 ms to 400 ms. A fixed charge mass weapon may produce a peak pressure on target that ruptures ears or damages the lungs or has little effect depending on the range of the target. Additional testing on human subjects has identified more finely resolved thresholds for desired effects on human targets including "warn/discomfort" 308 at approximately 172 dB, "stun/disorient" 310 at approximately 176 dB and "incapacitate" 312 at approximately 182 dB. To incapacitate, the acoustic pulses couple to the human pulmonary system or upper respiratory tract (e.g. lungs) in such a manner that the subject has difficulty breathing to the point they become temporarily incapacitated.

In a "point and shoot" mode the peak pressure produced by the burst at the shield may be fixed or may be operator selected e.g. low/medium/high or specific dB levels. The peak pressure 320 on target falls off as the range-to-target increases as shown in FIG. 6a. The "point and shoot" mode may be augmented with a proximity sensor that disables the shield if the range-to-target is less than a threshold. As shown, peak pressure 322 goes to zero inside the threshold range, shown here as 7 meters. The operator may fire a single shot or multiple shots. The operator may hold the trigger down and allow the shield to automatically fire a sequence of shots. The shield may be configured to limit the number of shots in a specified time interval or the number of shots on particular targets or target areas in a specified time interval.

In an "effect" mode the operator selects a desired effect. The shield measures range-to-target and possibly environmental/atmospheric conditions, computes a firing solution and then fires a burst of one or more pulses to place the peak pressure 308, 310 or 312 associated with the selected effect on and coupled into the target as shown in FIG. 6a. As the range-to-target changes, the shield automatically adjusts the firing solution to keep the same peak pressure on target. The controllability allows the pressure shield to be used effectively and safely to, for example, temporarily incapacitate a person without rupturing his or her eardrums. In another example, the operator could select the target, the effect and specify a perimeter range. The weapon would compute a firing solution and fire a sequence of shots over a wide beam width to establish a perimeter to keep people outside the perimeter.

In a "perimeter" mode the operator selects a desired effect and a specified perimeter (specified range-to-target). The shield configures the burst to generate the peak pressure 324 corresponding to the desired effect at the specified range as shown in FIG. 6b. In this example, the shield is set to "warn/discomfort" at a range of 30 meters. Again, the operator may fire a single shot or multiple shots. The operator may hold the trigger and allow the shield to automatically fire a sequence of shots to establish and maintain the desired perimeter. Multiple pressure shields may work together in cohort mode to establish a more extensive perimeter.

Figure 7:
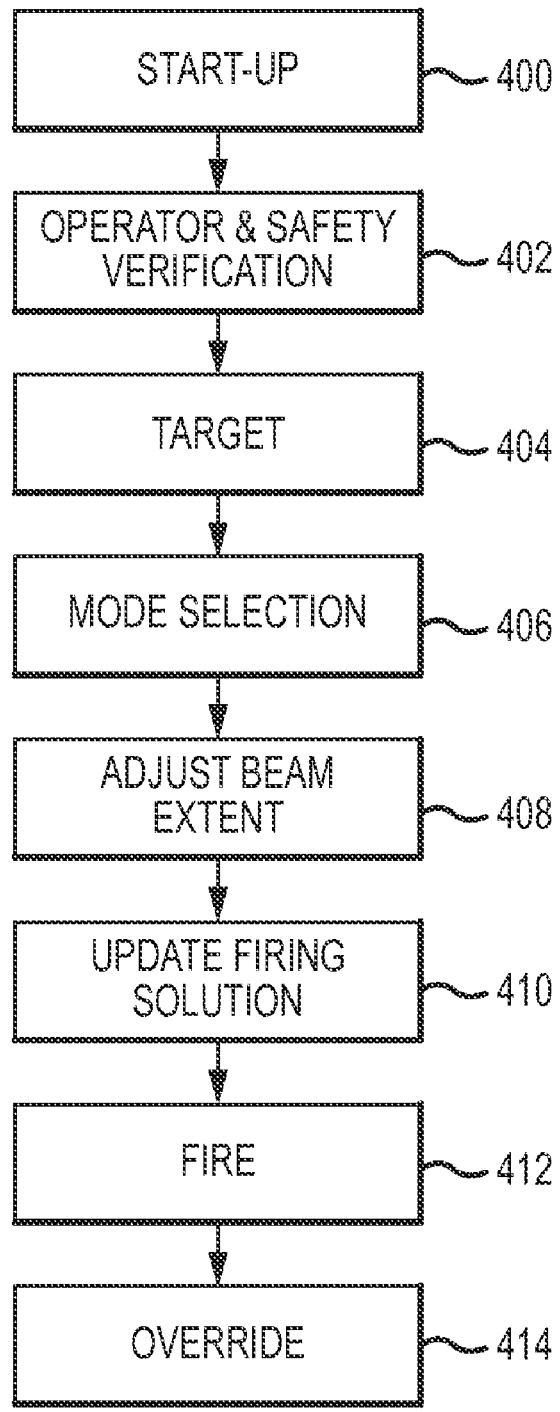
FIG. 7 is a flow diagram of an embodiment of the process for firing the pressure shield in unitary mode.

An embodiment of the operational flow for using a pressure shield in "unitary mode" is illustrated in FIG. 7. The pressure shield is turned on (step 400). The pressure shield must be turned "on" to enable its non-lethal capabilities. An operating system controls the safety and performance of the unit. The Pressure Shield OS (PSOS) manages all of the associated controls, displays, triggers, sights, visual systems, pressure modulation systems, safety management systems, attitude and positional inputs, and proximity networking systems, although individual systems may employ further control or operating systems.

Operator and safety verification are performed (step 402). Before the shield can be used, a shield operator must possess an authorized RFID user card and be positioned behind the shield. The Pressure Shield OS (PSOS) validates the authenticity of the RFID user card and verifies the geometric position of the user to be within the protected region of the shield. 3 RFID interrogators are coordinated by the PSOS to obtain the individual transit time differences between the 3 units. The PSOS compares these times against expected valid ranges, either allowing operation to continue if they are within range or disallowing operation if they are outside range. This system prevents the shield from being taken from the operator and used against them at close range. Having authenticated the shield operator's RFID card and verified a safe operating position, the PSOS waits for proper handgrip engagement before presenting the ready-to-fire icon and wording on the Status Display and/or HUD. This ensures the shield operator has a secure grip on the shield before permitting firing. The shields may include a forward-facing proximity sensor to reduce the likelihood of minimal distance engagements. Proximity sensor is initiated and reports distance to targets at all times. If the distance to closest target falls below a set critical value, PSOS enters non-operational standby mode. PSOS verifies proper fuel cartridge engagement and reports fuel status. The physical orientation of the shield is verified using accelerometers to avoid downward-facing shots. The position of the shield is measured and confirmed to lie with an "authorized zone".

The operator points the pressure shield at a target or target area (step 404). Targeting capabilities are tailored to customer needs. The shield can operate without an adjunct targeting system. More advanced targeting methods include a heads-up display (HUD) integrated on top of the shield. The HUD provides targeting estimation by displaying two vertical brackets on the HUD to indicate the extent of the pulsed pressure beam. The HUD automatically accounts for changes in beam extent, updating in real-time as the beam is modified. The HUD also places dots on the closest most likely targets of interest. This gives immediate feedback for the shield operator to know which effects each target will receive. These target-of-interest (TOI) dots are color coded to represent likely effectiveness of the selected effects, whether Warn, Stun, or Incapacitate. The HUD also displays status and performance information/warnings (e.g. if a particular target is getting too far away to expect sufficient engagement.) The HUD may also display position and orientation information, firing or countdown to firing information. An additional target method uses head-tracking goggles worn by each shield operator. The goggles follow the head movements of the operator and display the most likely achievable beam in 3 dimensions given the feedback from available sensors.

The PSOS reads the status of the Effect Level switch on the handgrip (Safe Corridor, Warn, Stun, Incapacitate) (step 406). Any subsequent changes to this switch immediately change the pressure amplitude at the current target location during an active firing, if firing, and for all subsequent firings if not firing.

The PSOS reads the setting on the beam extent dial, which sets the effective beam extent from Narrow to Wide (step 408). The shield operator has the option of selecting the desired beam extent, from minimum value of about 20 degrees up to about 60 degrees. The Pressure Shield achieves a variable extent by synthesizing frequencies lower than when $\lambda$ is approximately equal to the diameter of the shield's aperture (whether circular, square, or the shorter edges of a rectangle). As transmitted frequencies drop below λ, the achieved beam extent widens. A lower limit exists due to increasing rear-lobe energy where the shield operator stands. If this is a desired performance region, the shield operator interface can be modified to place the operator at 45 degrees off "boresight" (e.g. the centerline running straight from the back of the shield to the front of the shield), either right or left side, which locates the operator further away from the rear-lobe (depending on frequency and aperture selection).

The PSOS calculates a firing solution based on the beam pattern information and sensor inputs such as range-to-target (step 410). The PSOS warms up the sonic pulse generator until it is in ready-to-fire state. This may take different periods of time depending on pulse generator technology in use. The expected wait time, if applicable, counts down on the Status Display and on the HUD.

If the shield operator pulls the firing trigger, and the shield is in a Fire Ready state, the shield engages the SPG at a specific amplitude and frequency corresponding to the target range, effect level, and selected beam extent to fire a shot (step 412). As soon as a firing burst has occurred, the shield can be fired again until fuel stores are too low to properly engage the SPG or the shield leaves Fire Ready state for any reason (e.g. proximity alarm, shield moves out of authorized zone, malfunction in the SPG, pointing at the ground or other orientation errors, authorized user is not centered behind the shield in a safe operational manner).

If problems occur, the shield has an override mode that allows the operator to fire the weapon (step 414). For example for each override firing, the shield may modulate a single energy level without regard to target range; it incapacitates at the minimum engagement range, which falls to stunning and warning effects as range increases.

As described previously, multiple pressure shields may form "networks" to facilitate coordinated action among multiple pressure shields as a force multiplier or to provide a more sophisticated pressure barrier. The network may, for example, be configured with a master/slave relationship in which a designated master shield selects a desired networked beam, calculates the beam patterns for each shield and distributes those patterns to the shields which fire in unison. Alternately, the network may be a distributed network in which neighboring shields share beam pattern information and adjust their own beam patterns accordingly, based on the situation on the ground and the operators' training and any special requests broadcast by neighboring shields. The network may be "ad-hoc" in that networks may form spontaneously based on the requests of one or more shields. Shields may drop in and out of the network as their position/orientation or situation on the ground changes. Multiple networks may be formed or a single network may break into multiple smaller networks as needed.

To establish a secure, ad-hoc wireless network among a plurality of pressure shields in close proximity to each other, each shield must comprise a wireless transceiver to send and receive beam pattern information and any special requests. The wireless transceivers use a short-range secure wireless protocol for communication. The specific beam pattern information (e.g. position/orientation, beam extent, exit peak pressure, timing) and any special requests (e.g. safe corridors, maximum protection area, etc) will vary depending on whether the network is a master/slave or distributed network and whether the shield is sending or receiving. Each shield will also be provided with the means (GPS and/or RFID) to determine its position, typically in (x,y,z) latitude, longitude and elevation, but also including other applicable coordinate systems as necessary. Each shield is also suitably provided with the means (e.g. an inertial measurement unit (IMU) to determine its orientation, typically in roll, pitch and yaw. Depending on the application, all 6-degrees of freedom may not be necessary. For example, latitude and longitude plus pitch (looking left to right) may be adequate.

Figure 8A:
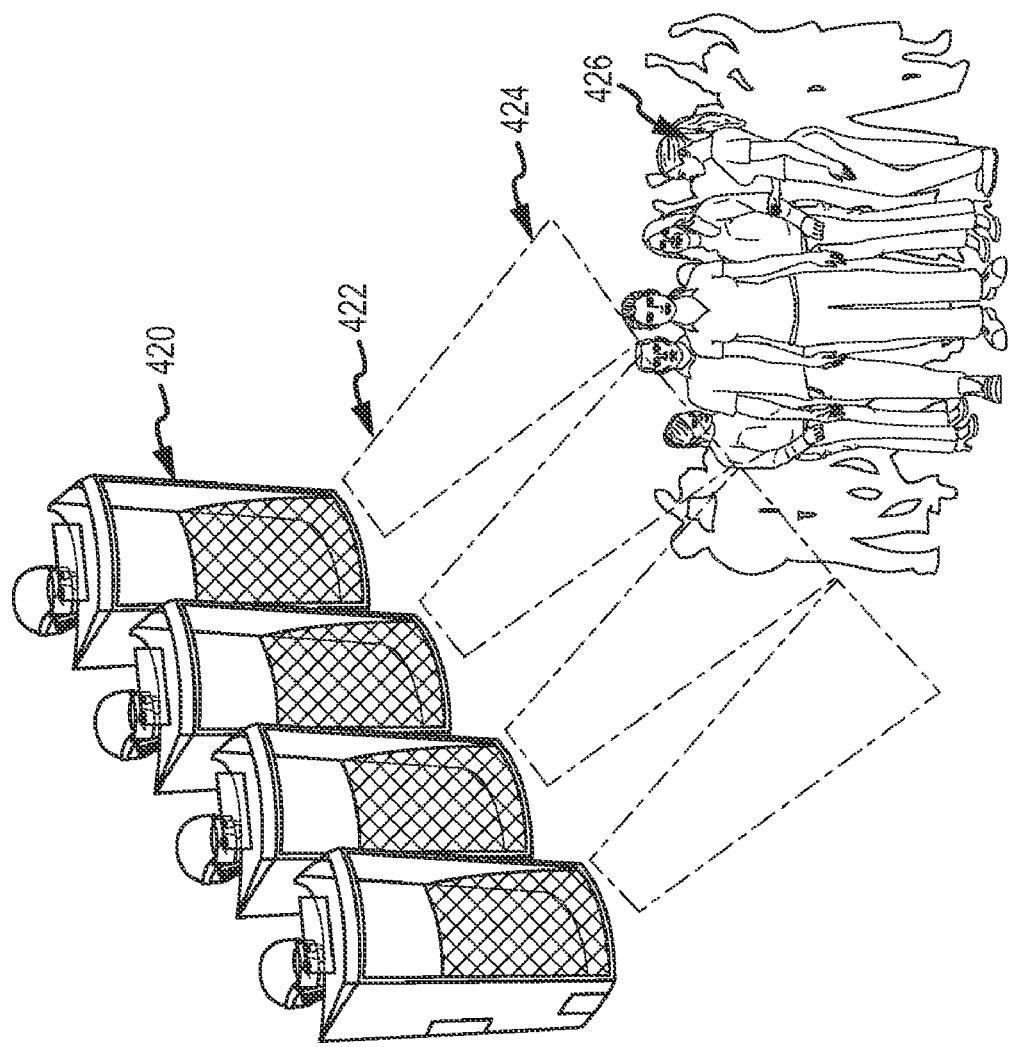

A network of pressure shields can provide a networked beam that is both more expansive and more sophisticated than the capabilities of a single shield. As shown in FIG. 8a, a plurality of pressure shields 420 are networked together and generate individual pulsed pressure beams 422 that cooperatively form a much larger networked beam 424 that defines a more effective perimeter between the operators and a large crowd 426. As shown in FIG. 8b, a large crowd 428 is attempting to exit a stadium through a few small exits 430 causing a potentially dangerous and volatile situation. The shields are networked to provide a networked beam that includes both active beams 432 and safe corridors 434 to guide the crowd safely to the exits. Both situations may be addressed with either the master/slave or distributed network. In the master/slave network, the master selects the networked beam and transmits beam patterns to the individual shields to execute. In the distributed network, neighboring shields can visualize the overall networked beam (or a neighboring portion thereof) and their contribution to the beam and adjust accordingly, taking into account the requests of the shields in front of the exits to define safe corridors.

Figure 9A:
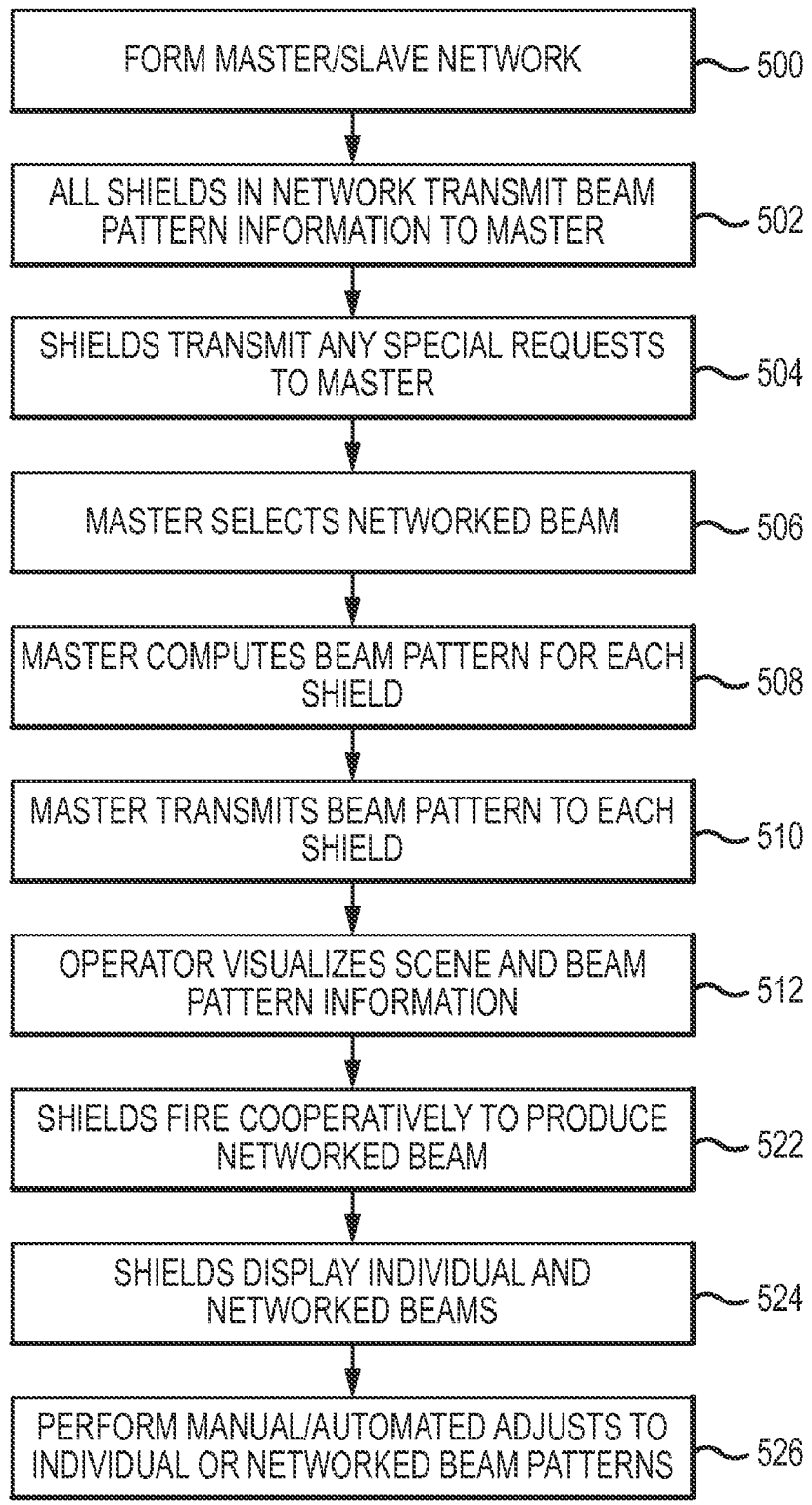
FIGS. 9a through 9c are a flow diagram and HUD for a master/slave network.
Figure 9B:
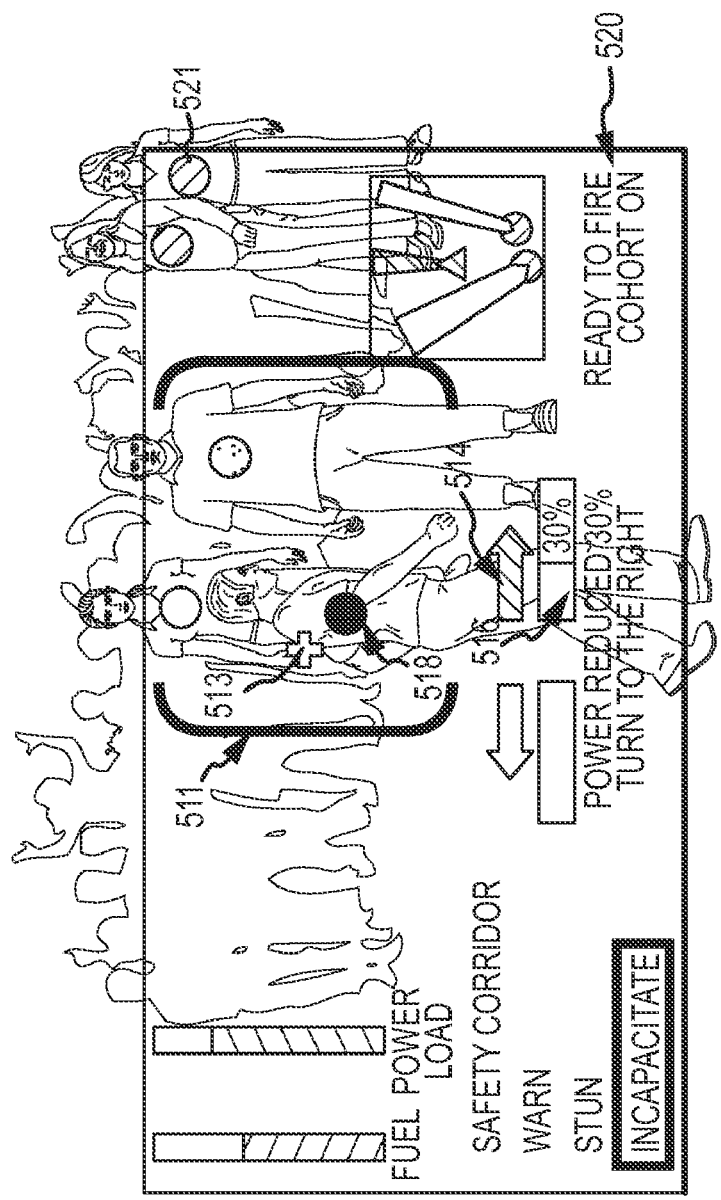

An embodiment of the operational flow for using a pressure shield in "cohort mode" for a master/slave network is illustrated in FIGS. 9a and 9b. The shields form a master slave/network (step 500). The network may be formed in different ways. Each operator may select "cohort mode" mode on the status display to join an existing network or to broadcast a request to form a network. A master shield may broadcast a command requesting neighboring shields to joint a network. In one particular embodiment, the relative rank of each operator is encoded on his or her RFID badge. The highest-ranking operator has the option of selecting "Cohort Mode" on the Status Display to form the network and to serve as the master. The highest-ranking operator may designate another operator as the master. Shields may drop in and out of the network as their position or the situation on the ground changes.

Once the network is formed, all of the shields in the network transmit beam pattern information to the master (step 502). At a minimum, the beam pattern information includes the position of each shield. The information may also include shield orientation. The shields also transmit any special request to the master (step 504). A special request may constitute a request to form a "safe corridor" in the active network beam, the "safe corridor" being an area largely devoid of any acoustic/pressure waves from the shields. The request specifies the beam extent and orientation of the shield (if not provided as part of the beam pattern information). Another special request may constitute a request to form a "max protect" area in front of the shield.

The operator of the master shield selects a desired network beam (step 506), which in part be based on any special requests from slave shields. The master may select a certain constant effect at a specified perimeter, a certain constant effect at a specified perimeter with one or more safe corridors, specify different effects in different regions of the networked beam. To facilitate selection, the master operator may be presented with a variety of "template" network beams that the operator can select and then simplify specify ranges and effects.

Once the networked beam is selected, the master shield computes beam pattern information for each of the slave shields (step 508) and transmits the information to each of the slave shields (step 510). The information may contain the position and orientation of the shield and the exit peak pressure, beam extent and timing to fire the shield. The master may, for example, develop a solution based on the assumption that the position and/or orientation of the shields are fixed. Alternately, the master may assume that the shield could shift position locally and/or change its orientation. The master may transmit command signals that automatically configure the slave to produce the desired exit pressure, bean extent and firing timing. Alternately, the beam pattern information may be provided to the operator to then set the exit peak pressure, beam extent and to fire when a timing signal counts to zero. The shield may provide cues to the operator to reposition or reorient the shield or to vary the pressure or beam extent. The degree of control exercised by the "master" may vary from controlling everything (beam power, beam extent, firing) except for physically holding and reorienting the shield to providing the desired beam pattern and allowing the slave shield and operator to implement the firing solution.

Figure 9C:
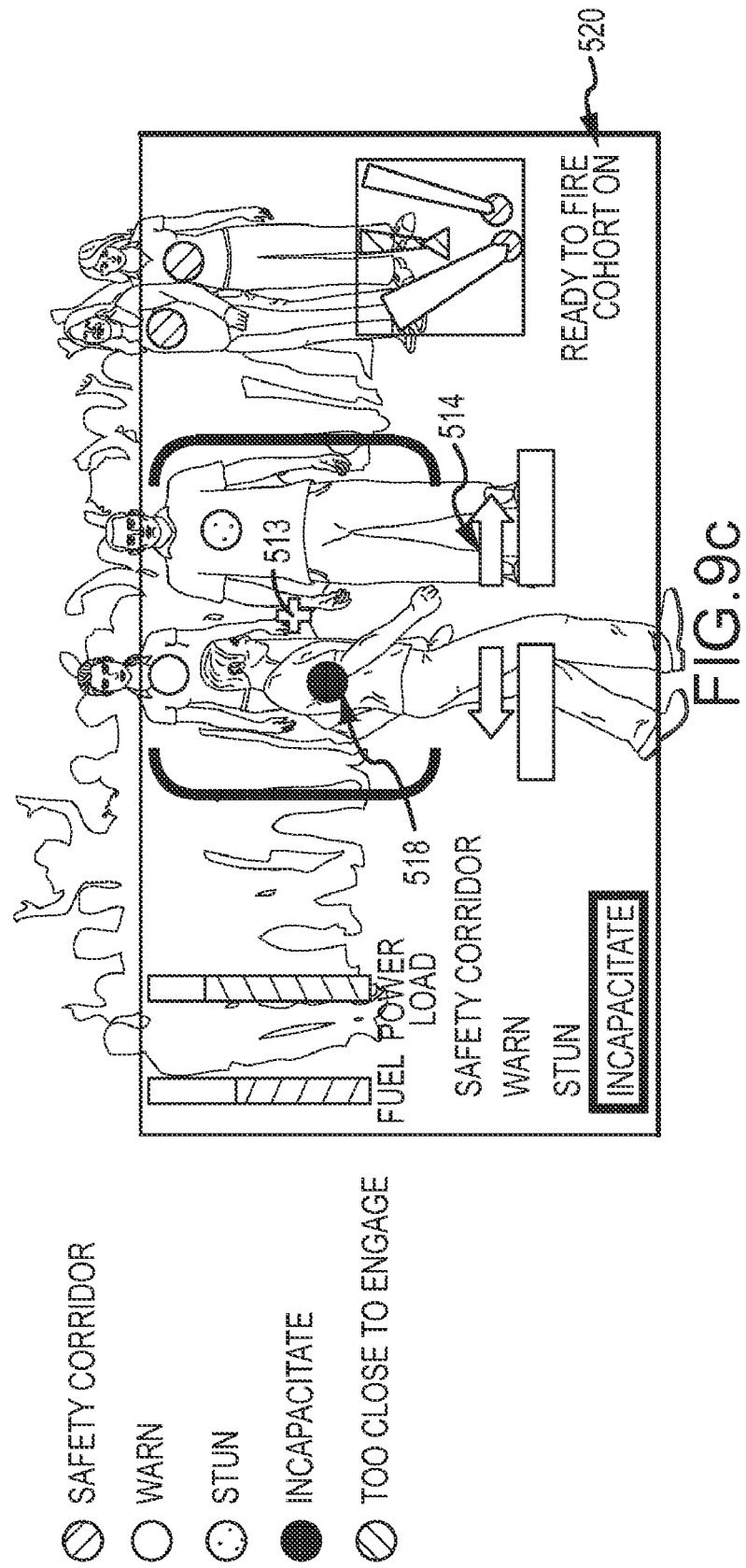

As shown in FIG. 9b, the operator may visualize the target scene and beam pattern information on the HUD (step 512). In this example, the HUD draws brackets 511 to indicate both the desired orientation and the extent of the beam. The master directly controls the extent of the beam, hence the spacing of brackets 511. Alternately, the master could dictate the beam extent but provide arrows or some other visual indicator on the HUD to direct the operator to narrow or widen the beam extent. In this example, the current orientation of the shield as indicated by the center-point cross 513 is too far left of the target area specified by the master. The HUD highlights the right directional arrow 514 in "red" to direct the operator to turn to the right to place the beam on three rock-throwing individuals. Because the current orientation and extent of the beam is not properly positioned, the master causes the beam power to be reduced as indicated by a power reduction bar 516, the greater the misalignment the greater the power reduction. The brackets stay locked on the commanded target while the slave shield turns. Once the operator has properly reoriented the shield so that center-point cross 513 lies in the center of brackets 511, the HUD turns both arrows 514 grey and restores beam power as shown in FIG. 9c. The HUD displays that cohort mode is "on" and shows the shield's beam extent among its neighbors 520. The HUD displays the selected effect, an orange dot 518 indicating incapacitate and highlights menu selection "INCAPACITATE". The HUD indicates firing status as well as turning the HUD red during firing. The HUD also depicts "safety corridor" requests as blue dots 521 to the right of the beam extent. As stated, the master may broadcast a timing signal that fires the shields in unison. For safety reasons, the system may require the operator to be holding the trigger down when the timing signal fires. Alternately, the operator may manually trigger the firing at zero.

The shields fire cooperatively to produce the networked beam (step 522). This may be a single shot or multiple coordinated shots. Each shield displays its own beam and the networked beam (step 524). The displayed networked beam may be the entire networked beam or just the portion of the networked beam neighboring each shield. This allows the operator or shield to perform any manual/automated adjustments (step 526) that are required to better achieve the networked beam or to adapt to changing circumstances on the ground such as changing position of the shield or advancing or retreating crowd.

Figure 10A:
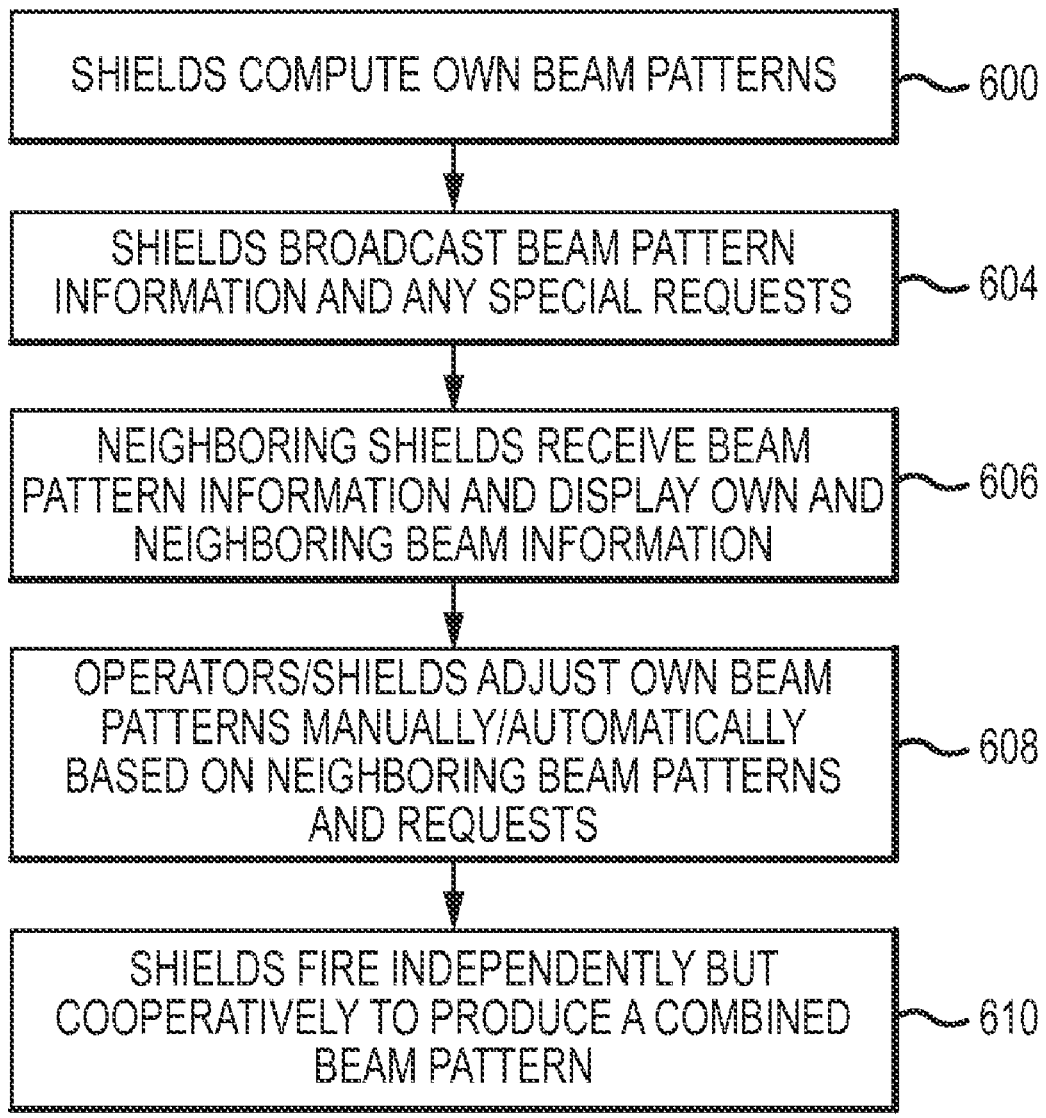
FIGS. 10a and 10b are a flow diagram and HUD for a distributed network.
Figure 10B:
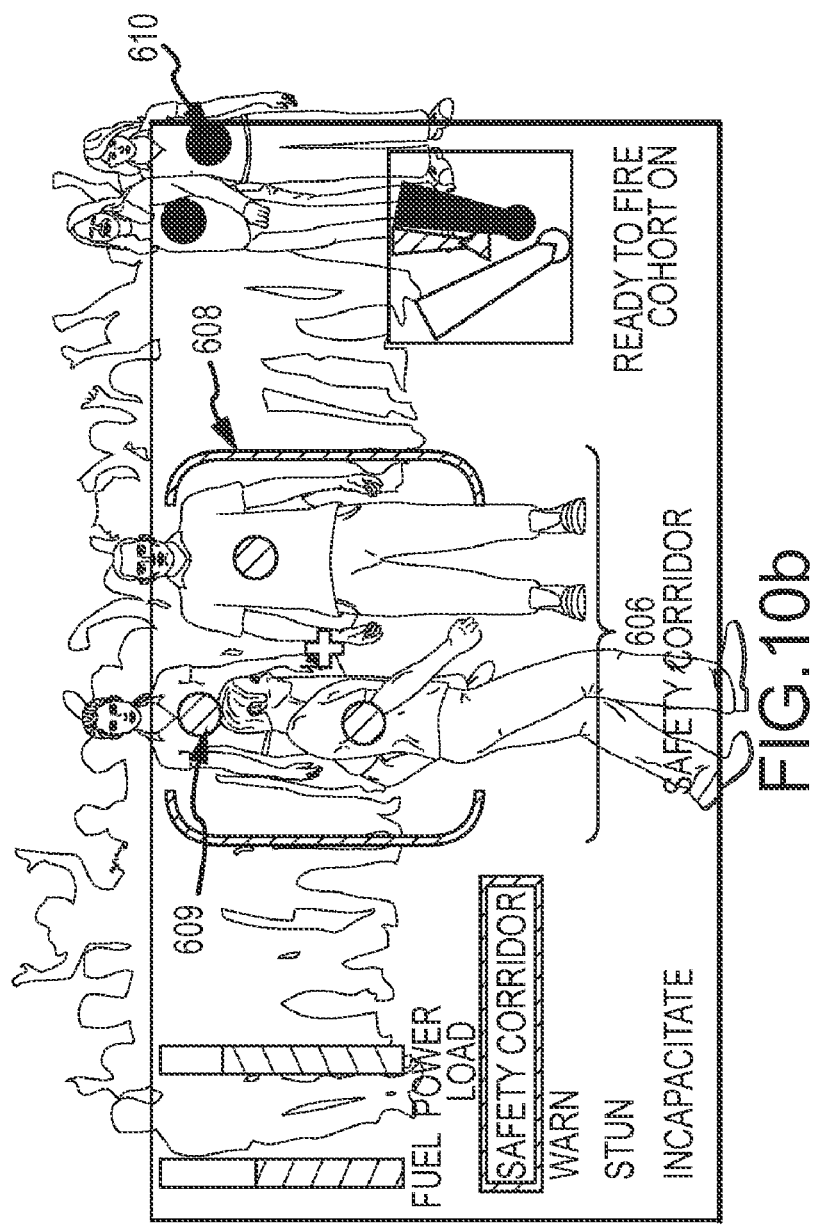

An embodiment of the operational flow for using a pressure shield in "cohort mode" for a distributed network is illustrated in FIGS. 10a and 10b. In the distributed network, each shield computes its own beam pattern (step 600). Each shield broadcasts its own beam pattern information and any special requests (step 602). Neighboring shields receive the broadcast beam pattern information and display their own beam information, neighboring beams and any cues generated in response to special requests from neighboring shields (step 604). As shown in FIG. 10b, a shield has computed a firing solution to define a "safe corridor" 606 within a portion of the crowd. Bars 608 indicate the extent of the safe corridor, also indicated by blue dots 609 on individual targets within the corridor. Other neighboring shields have broadcast their targets and effect levels as indicated by orange dots 610, representing INCAPACITATATION beams. If the shield's request for a "safe corridor" 606 conflicts (overlaps) with neighboring shields' active beams, those shields may generates arrows on their HUD that direct their operators to reorient or narrow their beam extent until there is no conflict, at which point the arrows are removed. By sharing this information the neighboring shields may adjust position/orientation or beam extent to form a more complete networked beam and effective perimeter. The operators/shields adjust their own beam pattern information and firing solutions manually/automatically based on these neighboring beam patterns and special requests (step 612). Thereafter, the shields fire independent but cooperatively to produce an ad-hoc networked beam (step 614). The distributed network provides more flexibility and local control than the master/slave network.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A man-portable non-lethal pressure shield, comprising:
    a physical shell having operator-facing and target-facing sides;
    a folded acoustic horn formed in the physical shell, said born having a pressure input port near the bottom of the shield on the operator-facing side and an acoustic aperture on the target-facing side;
    a sonic pulse generator mounted within the physical shell, said sonic pulse venerator configured to generate discrete acoustic pulses at a repetition rate that are coupled to the pressure input port, propagate around the folded acoustic horn and are emitted from the acoustic aperture in a pulsed pressure beam that approximates a plane wave;
    a controller that executes a firing solution to control the sonic pulse generator to venerate a shot including a burst of multiple pulses at a repetition rate; and
    an operator interface responsive to operator input to trigger a shot.

2. The pressure shield of claim 1, wherein the folded acoustic horn is integrally formed with the physical shell as one piece.

3. The pressure shield of claim 2, wherein the physical shell and folded acoustic horn are integrally formed of a visibly transparent material.

4. The pressure shield of claim 1, wherein the sonic pulse generator comprises one of an electro-mechanical system, a pressurized gas system, a chemical reaction system and a pulse jet system to generate the discrete acoustic pulses.

5. The pressure shield of claim 1 wherein the operator interface responsive to operator input to select an effect-on-target from a plurality of different effects, further comprising a sensor that measures range-to-target, said controller adjusting the peak pressure of the beam based on the measured range-to-target and the selected effect-on-target.

6. The pressure shield of claim 5, wherein the controller adjusts the peak pressure of the beam to maintain an approximately constant peak pressure on the target corresponding to the selected effect-on-target as the range-to-target changes.

7. The pressure shield of claim 1, further comprising a display that overlays beam pattern information over a targeted scene.

8. The pressure shield of claim 7, wherein the beam pattern information comprises the beam extent.

9. The pressure shield of claim 8, wherein the display is a transparent heads up display (HUD) that overlays the beam extent over the target scene visualized through the HUD by the operator.

10. The pressure shield of claim 8, wherein the operator interface is responsive to operator control to adjust the beam extent, said controller adjusting the frequency content of the burst of acoustic pulses to alter the beam extent.

11. The pressure shield, of claim 1, wherein the operator interface is responsive to operator control to adjust the beam extent, said controller adjusting the frequency content of the acoustic pulses to alter the beam extent.

12. The pressure shield of claim 1, wherein the controller sets a fixed repetition rate of the multiple pulses within a burst and adjusts the fixed repetition rate between bursts.

13. The pressure shield of claim 1, wherein the shield includes means for determining its position and enabling the shield to fire only if the shield position is in an authorized zone.

14. The pressure shield of claim 1, further comprising a proximity sensor that senses if a human target is within a specified minimum distance in front of the shield and disables the shield.

15. The pressure shield of claim 1, further comprising a sensor that only enables firing if an authorized operator is holding the shield and is operating the shield from a safe position.

16. The pressure shield of claim 1, wherein the user interface is responsive to operator selection of a cohort mode to cooperate with one or more other pressure shields, said shield comprising means for determining shield position and orientation and a wireless transceiver for communication of beam pattern information including at least position.

17. The pressure shield of claim 16, wherein beam pattern information further includes shield, orientation, beam extent, exit peak pressure and shot timing.

18. The pressure shield of claim 16, wherein said shield further comprises a display that displays that shield's beam and at least a portion of the shields' networked beam in the neighborhood of that shield.

19. The pressure shield of claim 18, wherein the display is a heads up display, said shield displaying visual indicators on the HUD to direct the shield operator to adjust the beam.

20. The pressure shield of claim 16, wherein said shield transmits a request for a safe corridor substantially devoid of pulsed pressure beams within the networked pressure beam, said other one or more shields adjusting their beams to provide the safe corridor.

21. The pressure shield of claim 16, wherein a network of a plurality of said shields is formed, at least one shield designated as a master with the remaining shields designated as slaves, said slaves transmitting their beam pattern information to said master, said master selecting a networked beam, calculating beam patterns for each shield and transmitting the beam patterns to the slave shields, said master and slave shields firing cooperatively to produce the networked beam.

22. The pressure shield, of claim 16, wherein said shield broadcasts its beam pattern information including at least shield position and orientation and beam extent, said neighboring pressure shields receiving said beam pattern information and adjusting their beams to act cooperatively.

23. A network of man-portable non-lethal pressure shields for generating a networked pulsed pressure beam, each said shield comprising:
 a physical shell having operator-facing and target-facing sides;
 a folded acoustic horn formed in the physical shell, said horn having a pressure input port near the bottom of the shield on the operator-facing side and an acoustic aperture on the target-facing side;
 a sonic pulse generator mounted within the physical shell, said sonic pulse generator configured to generate discrete acoustic pulses at a repetition rate that are coupled to the pressure input port, propagate around the folded acoustic horn and are emitted from the acoustic aperture in a pulsed pressure beam that approximates a plane wave;
 means for determining shield position and orientation;
 a wireless transceiver for communication of beam pattern information including at least position between shields;
 a controller configured to derive and execute a firing solution that controls the sonic pulse generator to generate a shot including a burst of multiple pulses at a repetition rate, said shot producing the pulsed pressure beam according to beam pattern information;
 a display that displays the shield's pulsed pressure beam and at least a portion of the shields' networked pulsed pressure beam in the neighborhood of the shield, and
 an operator interface responsive to operator input to fire the shot.

24. The network of claim 23, wherein the display is a heads up display (HUD), said shield displaying visual indicators on the HUD to direct the shield operator to adjust the beam to facilitate cooperative engagement of the network of pressure shields.

25. The network of claim 24, wherein a network of a plurality of said shields is formed, at least one shield designated as a master with the remaining shields designated as slaves, said slaves transmitting their beam pattern information to said master, said master selecting a networked beam, calculating beam patterns for each shield and transmitting the beam patterns to the slave shields, said master and slave shields firing cooperatively to produce the networked beam.

26. The network of claim 25, wherein the bean patterns transmitted by the master to the slaves causes the HUD to display the visual indicators to direct the shield operator to reorient the shield.

27. The pressure shield of claim 24, wherein said shields broadcast their beam pattern information including at least shield position and orientation and beam extent, said neighboring pressure shields receiving said beam pattern information and adjusting their beams to act cooperatively.

28. The network of claim 27, wherein the beam pattern information broadcast by the shields causes the neighboring shields' HUD to display visual indicators to direct shield operators to adjust their beams.

29. The pressure shield of claim 23, wherein at least one said shield transmits a request for a safe corridor substantially devoid of pulsed pressure beams within the networked pressure beam, said other one or more shields adjusting their beams to provide the safe corridor.

30. A network of man-portable non-lethal pressure shields for generating a networked pressure beam, each said shield comprising:
- a physical shell having operator-facing and target-facing sides;
- a folded acoustic horn formed in the physical shell, said horn having a pressure input port near the bottom of the shield on the operator-facing side and an acoustic aperture on the target-facing side;
- a sonic pulse generator mounted within the physical shell, said sonic pulse venerator configured to generate discrete acoustic pulses at a repetition rate that are coupled to the pressure input port, propagate around the folded acoustic horn and are emitted from the acoustic aperture in a pulsed pressure beam that approximates a plane wave;
- a controller that executes a firing solution to control the sonic pulse generator to generate a shot including a burst of multiple pulses at a repetition rate;
- a wireless transceiver for communication of beam pattern information between shields; and
- an operator interface responsive to operator input to trigger a shot, said shields' pressure beams generating a networked pressure beam.

31. The network of claim 30, wherein each shield comprises a display that displays visual indicators to the operator to adjust the pressure beam to facilitate cooperative engagement of the network of shields.

* * * * *

UNITED STATES PATENT AND TRADEMARK OFFICE
CERTIFICATE OF CORRECTION

PATENT NO. : 8,403,106 B2
APPLICATION NO. : 12/983001
DATED : March 26, 2013
INVENTOR(S) : James H. Bostick Page 1 of 1

It is certified that error appears in the above-identified patent and that said Letters Patent is hereby corrected as shown below:

In the Claims:

In column 14, claim 1, line 43, delete "venerator" and insert --generator--;

In column 17, claim 30, line 11, delete "venerator" and insert --generator--.

Signed and Sealed this
Fourteenth Day of May, 2013

Teresa Stanek Rea
*Acting Director of the United States Patent and Trademark Office*